United States Patent
King et al.

[15] 3,673,084
[45] June 27, 1972

[54] REVERSE OSMOSIS AND PROCESS AND COMPOSITION FOR MANUFACTURING CELLULOSE ACETATE MEMBRANES WHEREIN THE SWELLING AGENT IS A DI-OR TRI-BASIC ALIPHATIC ACID

[72] Inventors: William M. King, Walnut; Paul A. Cantor, Covina, both of Calif.

[73] Assignee: Aerojet-General Corporation, El Monte, Calif.

[22] Filed: July 14, 1969

[21] Appl. No.: 847,496

Related U.S. Application Data

[63] Continuation of Ser. No. 521,034, Jan. 17, 1966, abandoned.

[52] U.S. Cl. .............................. 210/23, 106/178, 210/500, 264/49, 264/331
[51] Int. Cl. ................ B01d 13/04, B29d 27/04, C08b 27/44
[58] Field of Search .................. 264/41, 49; 210/500, 23; 106/196, 178

[56] References Cited

UNITED STATES PATENTS

| | | | |
|---|---|---|---|
| 2,872,331 | 2/1959 | Grady et al. | 106/178 |
| 3,038,814 | 6/1962 | Cipriani | 106/178 |
| 3,238,042 | 11/1966 | Loeb et al. | 264/49 |
| 3,310,488 | 3/1967 | Loeb et al. | 264/49 X |

OTHER PUBLICATIONS

Grant, Julius, ed.; Hackh's Chemical Dictionary, Third Edition, New York, Blakiston, 1953, pp. 11– 13.

U.S. office of Saline Water, " The Mechanism of Desalination by Reverse Osmosis," by Aerojet– General. Research and Development Report No. 84, (November 1963), pp: III– 9 thru III– 11.

Manjikian, S. " Improvement in Fabrication Techniques for Reverse Osmosis Desalination Membranes," First International Symposium on Water Desalination, October 3– 9, 1965, Washington, D.C., pp. 1– 7, and 13.

Primary Examiner—Philip E. Anderson
Attorney—Edward O. Ansell, D. Gordon Angus and T. Reid Anderson

[57] ABSTRACT

A casting solution for the preparation of a cellulose membrance containing cellulose acetate, an organic solvent and a water-soluble organic swelling agent, which is capable of hydrogen bonding with ketone and hydroxyl groups of the cellulose acetate, said organic swelling agent being present in an amount between about 1.0 to about 10 parts by weight of each 10 parts of the cellulose acetate, said organic swelling agent being of a different composition than the organic solvent and being, for example, a di- or a tri-basic aliphatic acid having from two to 13 carbon atoms.

12 Claims, 2 Drawing Figures

PATENTED JUN 27 1972 3,673,084

INVENTORS
PAUL A. CANTOR
WILLIAM M. KING
BY
Edward O. Ansell
ATTORNEYS

REVERSE OSMOSIS AND PROCESS AND COMPOSITION FOR MANUFACTURING CELLULOSE ACETATE MEMBRANES WHEREIN THE SWELLING AGENT IS A DI- OR TRI-BASIC ALIPHATIC ACID

This application is a continuation of U.S. Ser. No. 521,034, filed Jan. 17, 1966 and now abandoned.

This invention relates to a new process and casting solutions for forming novel membranes which are useful in removing water from aqueous solutions and which have particular application in the desalination of sea water and brackish water containing high salt concentrations.

It has been proposed heretofore to employ cellulose acetate membranes for desalination of sea water by reverse osmosis. In one prior art process for the preparation of the membrane, as taught in Loeb et al., U.S. Pat. Nos. 3,133,132 and 3,133,137, the cellulose acetate is dissolved in a suitable organic solvent such as acetone to form a casting solution which in addition contains water and swelling agent for the cellulose acetate in the form of a perchlorate salt. The casting solution is dispersed in a thin film on a suitable casting surface to form a membrane, following which the solution is partially evaporated and then set in cold water. The cast film is annealed by heating at an elevated temperature to accomplish a contraction of the cellulose acetate structure which results in a tight membrane having the ability to pass water and restrain the passage of salt.

As object of this invention is to provide a process for producing membranes which are useful in removing water from aqueous solutions. A further object is to provide a novel casting solution for the production of cellulose acetate membranes. Another object of this invention is the production of novel cellulose acetate membranes having superior properties to those heretofore available for the removal of water from aqueous solutions by reverse osmosis. It is a still further object of the invention to provide a novel class of swelling agents for the production of a reverse osmosis cellulose acetate membrane. Additional objects will become apparent from a reading of the specification and claims which follow.

It has now been found that novel cellulose acetate membranes having desirable properties may be prepared from casting solutions containing organic swelling agents. In forming the membrane, we first form a solution of cellulose acetate in an organic polar solvent. Typical of such organic solvents are acetone, tetrahydrofuran, dimethylformamide, dioxane, dimethyl sulfoxide, butyrolactone, and/or other cellulose acetate solvents known to the art. A preferred solvent for use in our process is acetone. A typical casting solution comprises 10 parts by weight of cellulose acetate and 30 parts by weight of an organic casting solvent such as acetone. The desired quantities of solvent for dissolution of the cellulose acetate are known to the art but generally are those required to provide a workable casting solution. Although not essential, the casting solution generally contains from about 2 to about 20 parts of water for each 10 parts of cellulose acetate. More preferably, the casting solution contains from 2 to about 9 parts of water for each 10 parts of cellulose acetate since water concentrations within this range provide a superior film.

A polar organic swelling agent is then added to the casting solution of the invention in an amount ranging between about 1.0 to about 10 parts by weight for each 10 parts of cellulose acetate. Preferably, the organic swelling agent is provided in the casting solution in a range between 2.5 to 8 parts for each 10 parts of cellulose acetate. The organic swelling agents which we employ in the casting solution, are organic water-soluble compounds which are capable of hydrogen bonding, i.e., having the ability of bonding through hydrogen with the ketone or hydroxyl groups of the cellulose acetate.

Desirably, the organic swelling agents do not decompose in water, however, in the instance where the organic swelling agent is an acid, the agent may, of course, be disassociated by the water. Preferably the organic swelling agents are miscible with water and are soluble in the cellulose acetate casting solvent whether it be acetone, tetrahydrofuran, dimethylformamide, dioxane, dimethyl sulfoxide, butyrolactone, or other polar solvent. A further requirement of the organic swelling agents is the absence of groups which will react with the cellulose acetate or the particular solvent selected for the membrane preparation. As an example, the organic swelling agents do not contain isocyanate groups, acid halide groups or sulfonyl halide groups, since all of these groups are known to react with the ketone and hydroxyl groups found in cellulose acetate.

The organic swelling agents of the invention differ significantly from the inorganic perchlorate swelling salts proposed by Loeb et al., in that they are non-ionic or only slightly so. It has been suggested that the Loeb et al. swelling salts function through an ionic mechanism which controls the water content and ultimate osmotic properties of the membrane. The organic swelling agents of the invention do not possess formal electrical charges as do the cations of the Loeb et al. inorganic salt. The effective organic swelling agents are polar and are believed to associate with the cellulose acetate and water through hydrogen bond formation. The preferred organic swelling agents of the invention belong to classes recognized to be highly effective in hydrogen bonding. The preferred organic swelling agents include acids, alcohols, amides and primary and secondary amines, all of which possess electron-rich or basic centers (oxygen or nitrogen atoms) as well as active hydrogen atoms (acid centers). Pimentel et al. in their book, *The Hydrogen Bond*, W. H. Freeman & Co., San Francisco, 1960, classified the foregoing acids, alcohols, amides and amines as Type A-B (Acid-Base).

The organic swelling agents which we employ can be generally described by the following formula:

$$B - (D-H)_v \qquad \text{I.}$$

in which B is an organic moiety, $v$ is an integer from 1 to about 5, and D is a group in which oxygen, nitrogen, or phosphorus is bonded to the hydrogen atom shown in the formula. More specifically, the organic swelling agents have the formula:

$$T - (Q)_n \qquad \text{II.}$$

In the above formula, $n$ is a whole number ranging from 1 to about 5 and more preferably from 1 to about 3, and Q is a nucleophilic group selected:

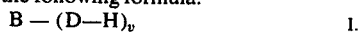

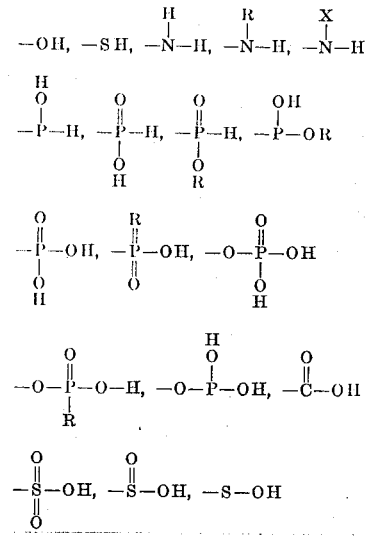

In the above definition of Q, R can be a substituted or unsubstituted aliphatic group preferably containing from one to about six carbon atoms, an aryl group which is preferably monocyclic, a substituted or unsubstituted aryl containing aliphatic group such as alkaryl, aralkyl, or an alicyclic group. In the case where R is an aryl group, an aryl containing aliphatic or an alicyclic group, the R group preferably contains less than about 12 carbon atoms. X in the above definition can be the anion of any inorganic acid, except those such as sulfonyl halides which are reactive with ketone and hydroxyl functions. Of particular interest are compounds in which X is NO₂ on NF₂.

T in the formula II above is an organic radical which preferably has the meaning defined in the preceding paragraph for R with the exception that T can, of course, be polyvalent and has a valence equal to n, and can be hydrogen except in those instances where Q is an anion of an inorganic acid. R and T, as defined above, can be unsaturated and can be substituted with any group which does not react with the hydroxyl or ketonic groupings found in cellulose acetate.

The more desirable organic swelling agents are represented by the above formula II in which Q is

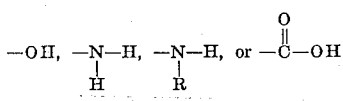

Of the above defined organic swelling agents, we found that several categories are more suitable than others in the formation of cellulose acetate membranes. A first such category are the organic acids including the preferred polybasic acids, having the formula

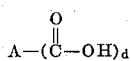

in which A is hydrogen or an alkylene group containing from one to about 10 carbon atoms and d is an integer ranging between 1 and 3. Representative members of the above group include oxalic acid, pimelic acid, sebacic acid, formic acid, acetic acid, pentanoic acid, hexanoic acid, and the like. A in the above formula can be substituted with groups which do not react with the hydroxyl or ketonic groupings found in cellulose acetate. To illustrate, when A is substituted with a hydroxyl group, as in the instance of tartaric acid, it has been found that the resulting polybasic acid is very suitable as a swelling agent for cellulose acetate.

Another preferred class of organic swelling agents are amines having the following formula

in which E is an aliphatic group containing from one to about six carbon atoms or hydrogen with the proviso that if one of the E groups is hydrogen the remaining E group is an aliphatic group. E may, of course, be substituted with any group which will not react with the hydroxyl or ketonic groupings found in cellulose acetate. Illustrative compounds within the above formula are amylamine, propylamine, methylamine, dimethylamine, methylhydroxyethylamine, diisopropylamine, and the like.

Another preferred class of organic swelling agents have the formula

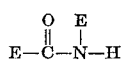

in which E is, as defined previously, an aliphatic group containing from one to about six carbon atoms or hydrogen. E can be substituted with any group which does not react with the hydroxyl or ketonic groupings in cellulose acetate. Typical of the amides defined by the above formula are formamide, propionamide, methyl formamide, and the like.

A further class of preferred organic swelling agents are the alcohols represented by the formula:

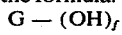

in which G is an aliphatic group containing from one to about eight carbon atoms and f is an integer ranging from 1 to about 3. Typical compounds are methanol, ethanol, propanol, tert-butyl alcohol, ethylene glycol, trimethylol propane, trimethylol ethane, 1,5,7-trihydroxy heptane, and the like. When G is a di- or tri-valent hydrocarbyl radical, it preferably contains from two to about nine carbon atoms.

A still further preferred class of organic swelling agents are phosphorus compounds having the formulas:

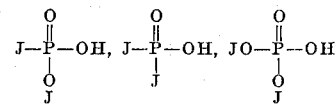

in which J is a substituted or unsubstituted aliphatic, aryl, aryl containing aliphatic or alicyclic group, or hydrogen. If one of the J groups is hydrogen, the other group is an organic group as defined. The groups represented by J can contain up to about 10 carbon atoms. Representative compounds within the above definition are benzenephosphonic acid, diethylphosphonic acid, the methyl ester of methyl phosphonic acid, hydroxymethyl phosphonic acid, methyl phosphonic acid, methyl phosphate, phenyl phosphate, hexyl phosphate, benzyl phosphate, dimethyl phosphate, diethyl phosphate, methyl cyclohexyl phosphate, and the like.

Another preferred class of organic swelling agents are the sulfonic acids having the formula

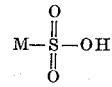

in which M is an alkyl, an aryl, an alkaryl, an aralkyl, or an alicyclic group containing up to about 10 carbon atoms. M can be substituted with any group which will not react with the hydroxyl or ketonic functions in cellulose acetate. Typical of such compounds are methyl sulfonic acid, ethyl sulfonic acid, cyclohexyl sulfonic acid, benzene sulfonic acid, benzyl sulfonic acid, nitro benzyl sulfonic acid and the like.

Another category of preferred organic swelling agents are the substituted amines having the formulas

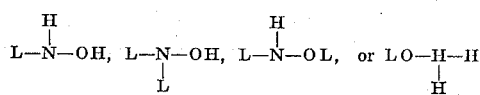

in which L is an aliphatic group containing from one to about 10 carbon atoms. L may be substituted with any group which will not react with the hydroxyl or ketonic functions in cellulose acetate. Representative compounds are dimethyl hydroxylamine, diethyl hydroxylamine, methyl hydroxylamine, ethyl hydroxylamine, ethoxy amine, methoxy amine, ethyl ethoxy amine, hexyl hydroxylamine, and the like.

Another class of preferred organic swelling agents are the carbamates having the following formulas

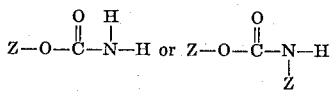

in which Z is an aliphatic group containing from one to about four carbon atoms. Z can be substituted with any group which will not react with the hydroxyl or ketonic functions of cellulose acetate. Typical of such compounds are methyl carbamate, ethyl carbamate, isopropyl carbamate, n-propyl carbamate, n-butyl carbamate, the ethyl ester of ethyl carbamic acid, the ethyl ester of methyl carbamic acid, and the ethyl ester of propyl carbamic acid.

Within the concentration range described above for the organic swelling agents, the amount of swelling agent may be varied by those skilled in the art to give the properties desired in the cellulose acetate film. As the amount of swelling agent is increased in relation to the amount of cellulose acetate, the flux (the amount of water which the cellulose acetate membrane will pass per square foot of membrane surface per 24-hour period) will generally increase and the salt permeation (the concentration of salt in the product stream passing through the membrane expressed in parts per million) will also generally increase. Thus, the fabricator of a cellulose acetate membrane can increase the amount of swelling agent if a larger flux is desired or decrease the amount of swelling agent if a lower salt permeation is desired.

After forming the cellulose acetate casting solution in the manner described, the casting solution is generally agitated to insure homogeneity. Then, where acetone is employed as the cellulose acetate solvent, the casting solution is generally chilled to a temperature in the order of −10° to −15° C., and cast as a membrane at that temperature. The casting in one technique is accomplished by feeding the chilled solution through a hollow doctor blade with the blade resting on raised brackets at the edges of a glass plate. The blade is generally pulled across the plate at a rate such that the film which is formed has a thickness between about 10 and 20 mils. A typical casting rate is about 18 inches of film per second. Following the casting, the film is held in the instance of a membrane cast from an acetone solution for about 3 minutes at −10° to −15° C. to permit evaporation of the acetone solvent. During the casting operation, the doctor blade, glass plate, etc., are all maintained at about −10° to −15° C.

The plate and the film thereon are then dipped into cold water which ranges in temperature from about 1° to about 10° C. Preferably, the temperature of the cold water bath is maintained between 1.5° and 2° C. The plate is thrust into the ice water bath in one continuous motion with the plate making an angle between about 30° to about 60° with the surface of the water. When this is done, the film soon floats off the glass plate, at which time it is strong enough to handle. The film is then rolled up in a damp condition. If the film is permitted to dry, it loses its desirable properties and is unsuitable for desalination.

Following the above treatment, the film is set or annealed to accomplish a contraction of the structure which results in a tight membrane having improved desalination properties. In one known technique the film is annealed by heating in a water bath at a temperature of about 85° C. for a period in the order of 10 minutes.

Although described above as a batch operation, it should be understood that the films of the invention can be produced in a continuous manner by casting the membrane onto a moving belt which is pulled beneath a doctor blade and thence passed through a water bath. It should be understood that the overall process conditions employed will, in accordance with known technology, be varied depending upon the organic solvent employed in forming the casting solution, the properties desired in the cellulose acetate membrane, and other consideration.

The novel membranes formed by the process of the invention were tested by placing them in a test cell which is best understood by reference to the drawing wherein.

Figure 1:
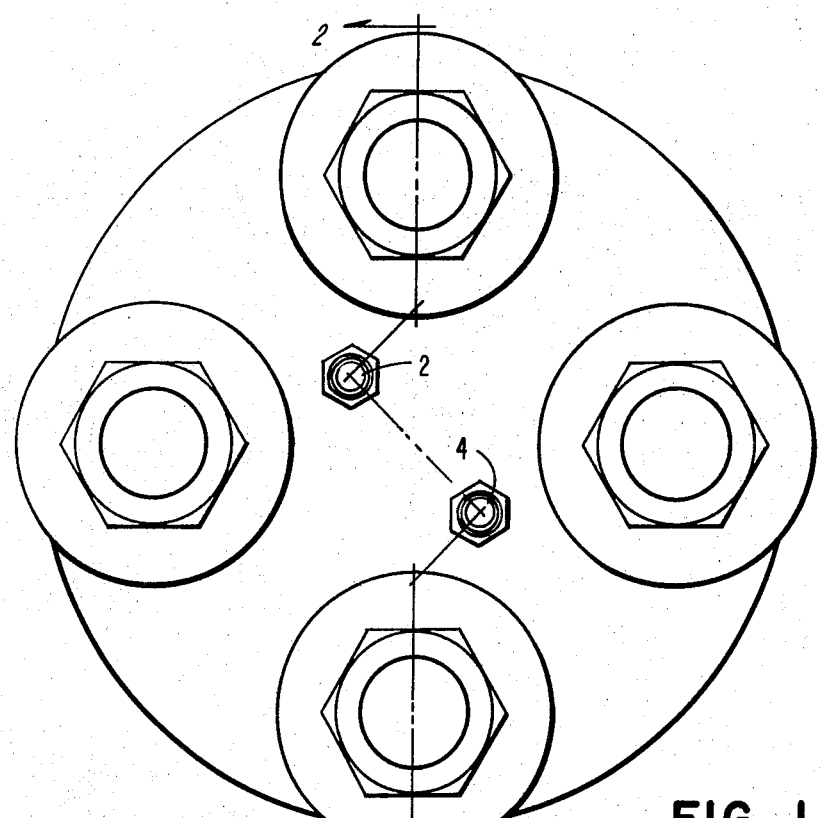
FIG. 1 is a top view of the test cell.
Figure 2:
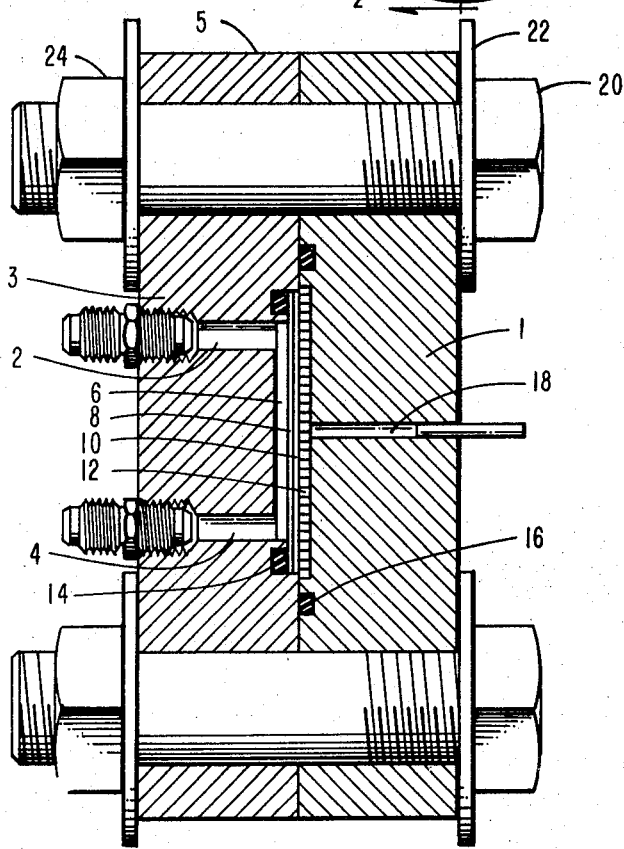
FIG. 2 is a sectional view of the test cell taken along the line 2—2 in FIG. 1.

Referring to FIG. 2, the test cell comprises two mating members 1 and 3, which are bolted together at interface 5 with a plurality of bolts 20, which threadably engage nuts 24 and bear on washers 22. Contained within cell member 3 are passages 2 and 4 whose outer extremities may include threadable connectors for use in attaching hydraulic lines. Passages 2 and 4 terminate in a cell chamber 6. Positioned in juxtaposition with cell chamber 6 are a desalination membrane 8, a paper filter 10, and a porous plate 12. The membrane, filter and plate are firmly held in place by an O-ring 14 which bears against them when the cell members 1 and 3 are joined together. A pressure O-ring 16 surrounds the cell chamber 6 and the filtering elements in juxtaposition therewith and maintains a pressure-tight seal between cell members 1 and 3 when they are joined together. Formed within the body of cell member 1 is a passage 18 which serves as the outlet for the product stream.

In operation, a feed stream of water containing a high concentration of salt is fed to the test cell through either passage 2 or 4. If fed through passage 2, the waste stream will be ejected through passage 4 or if fed through passage 4 the water is removed through passage 2. The feed stream enters cell chamber 6 under high pressure which can range up to 2,000 psig and higher. A portion of the salty feed stream passes through the membrane 8, the paper filter element 10, and the porous plate 12, and leaves the cell through the product passage 18. The remainder of the salty feed stream, which does not pass through the filtering elements, is ejected through either passage 2 or 4, as the case may be. In testing membranes in the test cell, a circular membrane portion having a diameter of 3 inches was employed as the membrane element 8 in obtaining the data which is described hereinafter.

To further illustrate the invention several membrane were prepared and tested with the data being presented in the following table. A basic cellulose acetate casting formulation was employed which contained 10 grams of Eastman Chemical Company, Rochester, N. Y., E–398–3 cellulose acetate (having an acetyl group concentration of 39.8 weight percent and an ASTM falling ball viscosity of 3 seconds) in admixture with 30 grams of reagent grade acetone and 5 grams of distilled water. This basic formulation was employed in forming each of the films indentified in the table. In the first column of the table is set forth the swelling agent which was added to 45 grams of the basic formulation. In the second column is set forth the additional amount of water (in grams) which was added to the basic formulation. In column three is set forth the flux through the finished membrane (gallons of water per square foot of film surface per 24-hour day). In the fourth column is set forth the salt concentration in the product stream issuing from the test cell in parts per million of sodium chloride. The figures set forth in columns three and four were obtained by subjecting a circular membrane portion having a diameter of 3 inches to a salt stream containing approximately 35,000 parts per million of sodium chloride at a pressure of 1,500 psig.

| Swelling Agent | (gms) | Additional Amount of $H_2O$ gms | Flux | salt permeation |
| --- | --- | --- | --- | --- |
| Malonic Acid | 3 gm | 2.0 gm | 13.0 | 315 |
| Oxalic Acid | 3.28 | 0.92 | 13.0 | 480 |
| Succinic Acid | 3.0 | 2.0 | 15.0 | 420 |
| Glutaric Acid | 3.0 | 2.0 | 14.0 | 315 |
| Formic Acid | 4.0 | 4.0 | 11.2 | 350 |
| Acetic Acid | 3.0 | 3.0 | 12.8 | 595 |
| Glycolic Acid | 3.0 | 0.5 | 14.6 | 445 |
| Lactic Acid | 3.0 | 1.5 | 14.2 | 605 |
| Maleic Acid | 3.28 | 2.80 | 12.8 | 380 |
| Tartaric Acid | 2.5 | — | 17.0 | 535 |
| Citric Acid | 2.5 | 0.2 | 15.5 | 510 |
| Tertiary Butyl Alcohol | 8.0 | 1.0 | 12.0 | 700 |
| Methanol | 6.0 | — | 5.4 | 810 |
| Ethanol | 7.0 | — | 6.5 | 615 |
| Isopropanol | 5.0 | — | 6.0 | 800 |
| Tertiary Butyl Amine | 6.0 | — | 14.8 | 700 |
| n-Butyl Amine | 6.0 | — | 18.0 | 2,350 |
| Isobutyl Amine | 6.0 | — | 14.0 | 5,900 |
| Formamide | 6.0 | — | 15.0 | 1,350 |
| Propionamide | 6.0 | 3.0 | 16.0 | 480 |
| Octanoic Acid | 7 | 5 | 4.4 | 24,000 |
| Phthalic (ortho) Acid | 4 | 8.0 | 10.4 | 420 |
| Propylamine | 5 | 2.0 | 14.0 | 720 |
| Diethylamine | 6 | 5.0 | 17.0 | 5,500 |
| Acetamide | 6 | 5.0 | 3.0 | 26,400 |

As shown in the above table, our process produces a superior cellulose acetate membrane for desalination when utilizing a wide variety of organic swelling agents, as described previously.

Having fully defined our invention in the foregoing specification, we desire to be limited only by the lawful scope of the appended claims.

We claim:

1. A method of separating water from an aqueous solution, said method comprising:
   a. preparing a casting solution containing cellulose acetate, an organic solvent and a water-soluble organic swelling agent, which is capable of hydrogen bonding with ketone and hydroxyl groups of the cellulose acetate, said organic swelling agent being present in an amount between about 1.0 to about 10 parts by weight for each 10 parts of the cellulose acetate, said organic swelling agent being of a different composition than the organic solvent and being a di- or tri-basic aliphatic acid having from two to 13 carbon atoms.
   b. casting the resulting solution to form a membrane of substantially uniform thickness;
   c. evaporating a portion of said organic solvent for a predetermined period of time;
   d. immersing the cast membrane in cold water to set the membrane;
   e. annealing the set membrane to accomplish a contraction of the structure; and
   f. applying under pressure an aqueous solution to one side of the membrane and separating water therethrough.

2. In a process of forming a cellulose acetate membrane as for reverse osmosis, the improvement comprising forming a casting solution containing cellulose acetate, an organic solvent and a water-soluble organic swelling agent, which is capable of hydrogen bonding with ketone and hydroxyl groups of the cellulose acetate, said organic swelling agent being present in an amount ranging between about 1.0 to about 10 parts by weight for each 10 parts of the cellulose acetate, and casting said solution to form a membrane, said organic swelling agent being of a different composition than the organic solvent and being a di- or tri-basic aliphatic acid having from two to 13 carbon atoms.

3. A process of claim 2 wherein said acid is malonic acid.
4. A process of claim 2 wherein said acid is oxalic acid.
5. A process of claim 2 wherein said acid is succinic acid.
6. A process of claim 2 wherein said acid is glutaric acid.
7. A process of claim 2 wherein said acid is maleic acid.
8. A process of claim 2 wherein said acid is tartaric acid.
9. A process of claim 2 wherein said acid is glycolic acid.
10. A process of claim 2 wherein said acid is lactic acid.
11. A process of claim 2 wherein said acid is citric acid.
12. A casting solution for the preparation of a cellulose acetate membrane, containing cellulose acetate, an organic solvent and a water-soluble organic swelling agent, which is capable of hydrogen bonding with ketone and hydroxyl groups of the cellulose acetate, said organic swelling agent being present in an amount between about 1 to about 10 parts by weight for each 10 parts of the cellulose acetate, said organic swelling agent being of a different composition than the organic solvent and being a di- or tri-basic aliphatic acid having from two to 13 carbon atoms.

* * * * *